United States Patent
Brooks et al.

(10) Patent No.: US 10,574,758 B2
(45) Date of Patent: *Feb. 25, 2020

(54) SERVER CONNECTION CAPACITY MANAGEMENT

(71) Applicant: International Business Machines Corporation, Armonk, NY (US)

(72) Inventors: Mike Brooks, Southampton (GB); Alan Hollingshead, Eastleigh (GB); Julian Horn, Eastleigh (GB); Philip Wakelin, Eastleigh (GB)

(73) Assignee: International Business Machines Corporation, Armonk, NY (US)

(*) Notice: Subject to any disclaimer, the term of this patent is extended or adjusted under 35 U.S.C. 154(b) by 9 days.

This patent is subject to a terminal disclaimer.

(21) Appl. No.: 15/842,961

(22) Filed: Dec. 15, 2017

(65) Prior Publication Data

US 2019/0037027 A1   Jan. 31, 2019

Related U.S. Application Data

(63) Continuation of application No. 15/662,783, filed on Jul. 28, 2017.

(51) Int. Cl.
| | |
|---|---|
| *H04L 12/00* | (2006.01) |
| *H04L 29/08* | (2006.01) |
| *H04L 29/06* | (2006.01) |
| *H04L 12/26* | (2006.01) |

(52) U.S. Cl.
CPC ....... *H04L 67/14* (2013.01); *H04L 43/0876* (2013.01); *H04L 67/42* (2013.01)

(58) Field of Classification Search
CPC ..... H04L 67/14; H04L 67/42; H04L 43/0876; H04L 69/40; H04L 41/0896; H04L 67/1008; H04L 43/16
USPC ................. 709/227, 228, 201, 219
See application file for complete search history.

(56) References Cited

U.S. PATENT DOCUMENTS

| | | | | |
|---|---|---|---|---|
| 5,442,749 A | * | 8/1995 | Northcutt | H04L 12/28 709/219 |
| 5,809,235 A | | 9/1998 | Sharma | |
| 5,812,784 A | * | 9/1998 | Watson | H04L 29/06 709/227 |
| 5,938,733 A | * | 8/1999 | Heimsoth | H04L 29/06 709/230 |

(Continued)

OTHER PUBLICATIONS

"Methods and Formulas Used to Determine Server Capacity", © 2018 Microsoft, 4 pages, <https://technet.microsoft.com/en-us/library/cc181325.aspx>.

(Continued)

*Primary Examiner* — Frantz Coby
(74) *Attorney, Agent, or Firm* — Nicholas D. Bowman

(57) ABSTRACT

Dynamic management of concurrent client connections to a server is achieved by a server, in that the server monitors its load state and when the server's maximum permitted number of concurrent requests has been exceeded it reduces the clients' maximum numbers of permitted concurrent requests until such time as the overloading situation no longer persists. In this way, the capacity of each of multiple connections can be controlled by the server individually or as a group, wherein the control is dynamic, so that the client-server connections do not have to be accurately configured in advance.

7 Claims, 6 Drawing Sheets

(56) References Cited

U.S. PATENT DOCUMENTS

| | | | |
|---|---|---|---|
| 6,148,335 A | | 11/2000 | Haggard et al. |
| 6,298,386 B1* | | 10/2001 | Vahalia .................. G06F 16/183 |
| | | | 709/234 |
| 6,324,492 B1* | | 11/2001 | Rowe ...................... H04L 43/50 |
| | | | 370/241 |
| 6,505,241 B2* | | 1/2003 | Pitts .................... G06F 12/0813 |
| | | | 709/203 |
| 6,615,258 B1 | | 9/2003 | Barry |
| 6,804,674 B2 | | 10/2004 | Hsiao |
| 6,845,383 B1 | | 1/2005 | Kraenzel |
| 7,003,572 B1* | | 2/2006 | Lownsbrough ......... H04L 29/06 |
| | | | 709/203 |
| 7,152,111 B2* | | 12/2006 | Allred .................. H04L 29/125 |
| | | | 709/227 |
| 7,171,668 B2 | | 1/2007 | Molloy et al. |
| 7,403,886 B2 | | 7/2008 | Odhner et al. |
| 7,404,205 B2* | | 7/2008 | Scoredos ............ H04L 63/0254 |
| | | | 709/228 |
| 7,580,972 B2 | | 8/2009 | Jones |
| 7,752,629 B2 | | 7/2010 | Revanuru et al. |
| 7,774,492 B2* | | 8/2010 | Raphel .................... H04L 47/10 |
| | | | 370/229 |
| 7,991,876 B2 | | 8/2011 | Yoda |
| 8,056,082 B2 | | 11/2011 | Koretz et al. |
| 8,224,963 B2 | | 7/2012 | Tsunogai |
| 8,335,847 B2 | | 12/2012 | Cassidy |
| 8,402,085 B2* | | 3/2013 | McCanne ............... H03M 7/30 |
| | | | 709/202 |
| 8,417,817 B1 | | 4/2013 | Jacobs et al. |
| 8,799,502 B2 | | 8/2014 | Raphel et al. |
| 8,825,820 B2 | | 9/2014 | Gerber et al. |
| 8,856,222 B2 | | 10/2014 | McCanne et al. |
| 8,935,399 B2* | | 1/2015 | Rajan ...................... H04L 67/14 |
| | | | 370/392 |
| 9,172,650 B2* | | 10/2015 | Rajan ...................... H04L 47/32 |
| 9,235,801 B2 | | 1/2016 | Portegys |
| 9,246,819 B1 | | 1/2016 | Thirasuttakorn |
| 9,253,025 B1 | | 2/2016 | Vinapamula Venkata et al. |
| 9,473,571 B2 | | 10/2016 | Day et al. |
| 9,479,575 B2 | | 10/2016 | Olsen |
| 9,749,899 B2 | | 8/2017 | Raleigh et al. |
| 2002/0152310 A1 | | 10/2002 | Jain |
| 2003/0046396 A1* | | 3/2003 | Richter .................. G06F 9/505 |
| | | | 709/226 |
| 2004/0006578 A1 | | 1/2004 | Yu |
| 2004/0047354 A1 | | 3/2004 | Slater et al. |
| 2004/0199571 A1* | | 10/2004 | Spiegl ................. H04L 41/5012 |
| | | | 709/201 |
| 2005/0187957 A1 | | 8/2005 | Kramer |
| 2006/0064496 A1* | | 3/2006 | Anderson ............... H04L 69/28 |
| | | | 709/228 |
| 2008/0049616 A1 | | 2/2008 | Kamath et al. |
| 2010/0274922 A1 | | 10/2010 | Reavely et al. |
| 2011/0304634 A1 | | 12/2011 | Urbach |
| 2012/0084838 A1 | | 4/2012 | Inforzato |
| 2012/0110595 A1 | | 5/2012 | Reitman |
| 2012/0185586 A1 | | 7/2012 | Olshansky |
| 2012/0263076 A1 | | 10/2012 | Zhao |
| 2012/0331127 A1 | | 12/2012 | Wang |
| 2013/0166092 A1 | | 6/2013 | Wang |
| 2013/0242984 A1 | | 9/2013 | Lee |
| 2015/0156133 A1* | | 6/2015 | Leitch .................... H04L 47/70 |
| | | | 709/219 |
| 2016/0087933 A1 | | 3/2016 | Johnson et al. |
| 2016/0173584 A1 | | 6/2016 | Fitzpatrick et al. |
| 2017/0223593 A1 | | 8/2017 | Koodli |
| 2018/0020048 A1 | | 1/2018 | Seol |
| 2018/0097707 A1* | | 4/2018 | Wright .................. G06F 9/5083 |
| 2018/0205799 A1 | | 7/2018 | Brooks |

OTHER PUBLICATIONS

"Server-connection channel limits", IBM Knowledge Center, last printed Jun. 5, 2018, 2 pages, <https://www.ibm.com/support/knowledgecenter/en/SSFKSJ_9.0.0/com.ibm.mq.con.doc/q015640_.htm>.

"Set a limit on the number of client connections", Citrix Product Documentation, Sep. 14, 2018, 1 page, <https://docs.citrix.com/en-us/netscaler/12/load-balancing/load-balancing-advanced-settings/set-limit-on-max-client.html>.

List of IBM Patents or Patent Applications Treated as Related. Filed Dec. 17, 2018. 2 pages.

Brooks, et al., "Dynamic Connection Capacity Management", U.S. Appl. No. 16/205,706, filed Nov. 30, 2018.

Original U.S. Appl. No. 15/406,903, filed Jan. 16, 2017.

"Best practices for developing with Microsoft Dynamics CRM" Dynamics CRM 2016, Dynamics CRM Online. Sep. 13, 2016. Eleven pages. <https://msdn.microsoft.com/en-us/library/gg509027.aspx>.

Deshmukh, et al. "Applying Load Balancing: A Dynamic Approach" vol. 2, Issue 6, Jun. 2012. International Journal of Advanced Research in Computer Science and Software Engineering. pp. 201-206.

Mell et al. "The NIST Definition of Cloud Computing" Recommendations of the National Institute of Standards and Technology. NIST Special Publication 800-145.Gaithersburg, MD.

Appendix P List of IBM Patents Treated as Related dated Dec. 12, 2017. Two pages.

Brooks et al. Original U.S. Appl. No. 15/662,783, filed Jul. 28, 2017.

* cited by examiner

SERVER CONNECTION CAPACITY MANAGEMENT

BACKGROUND

The present invention relates generally to the field of managing client connections to a server, and more particularly to avoid overloading the server.

A transaction processing component of a server, such as a Customer Information Control System (CICS) Transaction Server (TS) for IBM z/OS, may receive work from its clients over multiple network connections. (Note: the term(s) "CICS," "TS," "IBM," and/or "z/OS" may be subject to trademark rights in various jurisdictions throughout the world and are used here only in reference to the products or services properly denominated by the marks to the extent that such trademark rights may exist.) These connections can either be short lived or long lived. Connections from a web browser, for example, are generally long lived and may support potentially significant numbers of multiple concurrent requests. The requests from long-lived connections will therefore require management in order to ensure efficient operation, which is the subject of the present disclosure. Request and response messages are serialised over the connection and will typically be in packet form with a header portion and a payload portion. A message will contain request data that the client is passing to the server (or vice versa), which will form the payload or body of the message. The message will also contain metadata, which will form one or more headers of the message, where the role of the metadata is to provide instructions to the recipient of the message on how to handle the request data. Connections may be established when the server component starts up, and may be added or removed as the server component remains active. The server component will have a finite capacity, limited by factors such as the amount of use it can make of the central processing unit (CPU) of the machine it runs on, and the amount of memory it has access to. The system administrator configures server components to maximise the amount of work they can support, without running the risk of stalling because of resource shortages, and takes measures to avoid server components failing altogether from becoming overloaded. A limit is set on the maximum number of tasks that the server component can run concurrently. Typically this is greater than the number supported over an individual connection into the server component, but less than that for all the connections together, as there will be times when one connection is very busy while others are lightly loaded.

It may sometimes occur that a server component becomes overloaded, i.e. reaches its full capacity, when too much work arrives over a set of connections. The excess work requests received when the server component is already at full capacity cannot be processed immediately, so are queued in the server component, waiting for a time when it can be processed. However, the queue itself and its management consumes further system resources in the already-overloaded server component. There is currently no mechanism to automatically resolve these network issues, when a server component detects it cannot cope with its current workload.

Controls are known which prevent one network node from flooding a partnered network node with requests, when the partner is unable to process its current workload. For example, it is known to configure the request sender (referred to in this document as the client) so that it only has a fixed number of request slots. For example, the parameter "Number of Send Sessions" can be used to set a maximum number of concurrent requests that a client can route over a connection. The number is set when the connection is first established and persists for the lifetime of the connection. Another known example is where the service provider (referred to in this document as the server) maintains a queue for requests that have been received, but not yet processed, and, when the queue is full, the server causes any additional requests that it receives to be rejected. These approaches work well for paired systems which have only a single connection between them, as their overall capacity can be calculated in advance and so the capacity of the connection can be set to match. However, large scale systems often have multiple points of entry and so it is not a simple to task to configure their connections in a way which provides for efficient management of these requests.

For example, a CICS TS for a z/OS production server component is likely to have multiple connections to it over which request messages may arrive. The request traffic rate over any single connection is likely to vary considerably over time. Moreover, the request traffic rate between different connections is also likely to vary considerably over time. It is not practical to configure a server to match the maximum capacity of all of its clients, as this would lead to large amounts of redundancy. Instead, each connection is configured to support more than its fair-share of the server's overall capacity so that during times when the server is less busy a busy client can route a higher rate of requests to the server. Consequently, there may be prolonged periods of time during which requests are queued before they can be serviced by the server, or during which requests are rejected by the server.

To address this issue, it is known for clients to use additional software to discover if they are using a particular connection to its full capacity. Workload load balancing is a technique to distribute TCP/IP-based workload requests (connections) across similar server applications to achieve optimal resource utilization, maximize throughput, minimize response time, and to avoid overloading server applications or systems. By using multiple server applications (instead of a single server application) with load balancing, one can increase reliability through redundancy. The load balancing service usually is provided by a dedicated software program or hardware device. A workload manager provides distribution recommendations to the load balancing service (i.e. a load balancer appliance).

In workload management environments of this type, server applications that access the same data sources typically are included in the same workload. This allows monitoring agents to verify that all of these applications are available and able to handle additional connections on behalf of the workload. It also enables a workload manager to have a consolidated view of the applications in the workload, thereby enabling easy switching of the workloads between geographically separated sites (i.e., different clusters of systems). In particular, the workload manager can signal a load balancer appliance that all connections to the server applications making up the workload are to be switched at the same time to the alternate site. This ensures that access by the applications to the data sources is only done from one site at any point in time. The workload balancing software runs alongside the systems that are using the connection. There is however the disadvantage that such additional software has to be configured separately from the connection it monitors.

SUMMARY

In the present disclosure, we propose a coping mechanism for automatically avoiding persistent overloads in the transaction processing component of a server arising from the server receiving too many requests on concurrent connections, wherein the coping mechanism operates independently of any workload balancing measures which may or may not also be provided in parallel.

According to one aspect of the disclosure, there is provided a transaction processing server capable of managing multiple, concurrent client connections, the server comprising: a client-server connector operable to establish, maintain and terminate individual client-server connections to the server, each connection being capable of transmitting client requests to the server and each connection being configured to support a default, maximum permitted number of concurrent requests; a transaction processing component of a server operable to process client requests and issue responses to the clients that originated the requests; a connection capacity controller operable to monitor how many client-server connections are current and to keep a log of the default, maximum numbers of permitted concurrent requests that each current client-server connection is configured to support; a server capacity monitor operable to monitor loading of the server having regard to a maximum number of permitted concurrent requests the server is configured to support, wherein, through monitoring, when the server capacity monitor detects that the server is an overloaded state, the server capacity monitor is operable to issue a command to the connection capacity controller to reduce the maximum permitted numbers of concurrent requests on the current client-server connections, wherein in response thereto the connection capacity controller is operable to transmit to at least one of the clients with a current client-server connection a reduced, maximum permitted number of concurrent requests for that client-server connection.

When at least one of the client-server connections is operating with a reduced, maximum permitted number of concurrent requests, the server capacity monitor can be operable to detect when the server has recovered from its maximum number of concurrent requests being exceeded, and, in response, to issue a command to the connection capacity controller to increase the maximum number of concurrent requests on at least one of the current client-server connections from a reduced, maximum permitted number to a higher number equal to or less than the default, maximum permitted number for that client-server connection.

In some embodiments, the server further comprises: a queue in which requests for the server are queued when the server currently has no capacity to accept them, wherein the server capacity monitor is operable to monitor loading of the server by monitoring a fill state of the queue. In other embodiments, the server capacity monitor is operable to monitor loading of the server by monitoring activity within the server. The server capacity monitor monitors loading of the server by comparing how many requests the server is currently processing with the server's maximum permitted number of concurrent requests. The server capacity monitor can determine the load state of the server by comparing how many requests the server is currently processing with the server's maximum permitted number of concurrent requests.

According to another aspect of the disclosure, there is provided a method of managing multiple, concurrent client connections to a transaction processing server, the method being performed by the server and comprising: establishing, maintaining and terminating individual client-server connections to the server, each connection being capable of transmitting client requests to the server and each connection being configured to support a default, maximum permitted number of concurrent requests; processing client requests in a transaction processing component of the server and issuing responses to the clients that originated the requests; monitoring in a connection capacity controller how many client-server connections are current and keeping a log of the default, maximum numbers of permitted concurrent requests that each current client-server connection is configured to support; monitoring in a server capacity monitor loading of the server having regard to a maximum number of permitted concurrent requests the server is configured to support; detecting in the server capacity monitor that the server is in an overloaded state; issuing a command from the server capacity monitor to the connection capacity controller to reduce the maximum permitted numbers of concurrent requests on the current client-server connections; and transmitting from the connection capacity controller to at least one of the clients with a current client-server connection a reduced, maximum permitted number of concurrent requests for that client-server connection.

When at least one of the client-server connections is operating with a reduced, maximum permitted number of concurrent requests, and the server capacity monitor detects that the server has recovered from its maximum number of concurrent requests being exceeded, the server capacity monitor can issue a command to the connection capacity controller to increase the maximum number of concurrent requests on at least one of the current client-server connections from a reduced, maximum permitted number to a higher number equal to or less than the default, maximum permitted number for that client-server connection.

In some embodiments, requests for the server are queued in a queue when the server currently has no capacity to accept them, and, the server capacity monitor monitors loading of the server by monitoring a fill state of the queue. In other embodiments, the server capacity monitor monitors loading of the server by monitoring activity within the server.

According to another aspect of the disclosure, there is provided a computer program stored on a computer readable medium and loadable into the internal memory of a server, comprising software code portions, when the program is run on a server, for performing the above-described method. A computer program product storing the computer program may also be provided.

According to an aspect of the present invention, there is a method for managing concurrent client connections to a transaction processing server that performs the following steps (not necessarily in the following order): (i) establishing a set of individual connections to a server, the individual connections being client-server connections; (ii) maintaining each individual connection to the server wherein each individual connection is capable of transmitting a client request to the server and each connection is configured to support a certain number of concurrent requests, the certain number being a default, maximum permitted number; (iii) processing a client request in a transaction processing component of the server; (iv) issuing a response to the client request to an originating client; (v) monitoring in a connection capacity controller how many client-server connections are current; (vi) recording in a log the certain number of concurrent requests permitted by a client-server connection; (vii) monitoring in a server capacity monitor a loading of the server having regard to the certain number of concurrent requests the server is configured to support; (viii) detecting in the server capacity monitor that the server is in an overloaded state; (ix) issuing a command from the server capacity monitor to the connection capacity controller to reduce the certain number concurrent requests to a reduced number of concurrent requests; and (x) transmitting from the connection capacity controller to at least one of the clients with a current client-server connection the reduced number of concurrent requests.

DETAILED DESCRIPTION

Dynamic management of concurrent client connections to a server is achieved by a server, in that the server monitors its load state and when the server's maximum permitted number of concurrent requests has been exceeded it reduces the clients' maximum numbers of permitted concurrent requests until such time as the overloading situation no longer persists. In this way, the capacity of each of multiple connections can be controlled by the server individually or as a group, wherein the control is dynamic, so that the client-server connections do not have to be accurately configured in advance.

In the following detailed description, for purposes of explanation and not limitation, specific details are set forth in order to provide a better understanding of the present disclosure. It will be apparent to one skilled in the art that the present disclosure may be practiced in other embodiments that depart from these specific details.

A client according to embodiments of the present disclosure may be any suitable computing device; for example a mobile phone (smartphone), phablet, tablet, laptop computer, gaming console, personal computer, smart television or media player. The computing device may be a user equipment as defined by one or more telecommunications standards. The computing device may be portable, e.g. a handheld computing device, or fixed.

Figure 1:
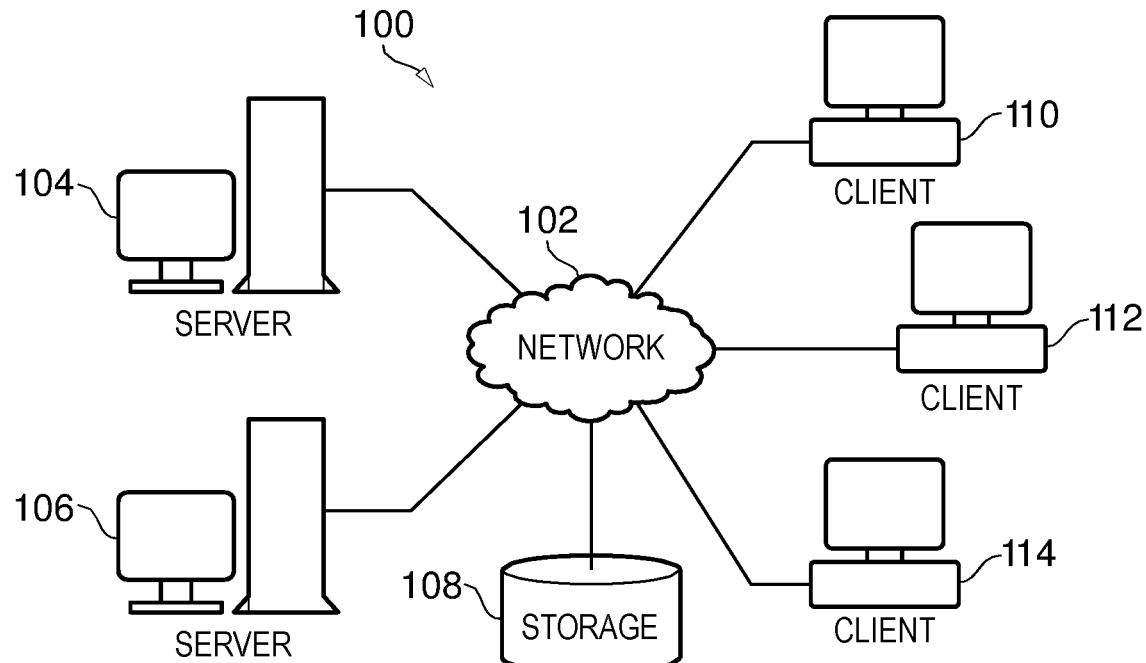
FIG. 1 is an exemplary block diagram of a first embodiment of a distributed data processing environment according to the present invention.

FIG. 1 is an exemplary block diagram of a distributed data processing system 100 with which exemplary aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables. Network 102 may be an external network such as the Internet, or an internal network such as an Ethernet Network or a Virtual Private Network (VPN).

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

Server 104, 106 each include or have access to a computing device comprising one or more processors and one or more memories, and potentially any other computing device elements generally known in the art including buses, storage devices, communication interfaces, and the like. The server having an input port for receiving communication from other computing devices including those with which it may form a client-server communication channel, and an output port for transmitting communications to other computing devices including those with which it may form a client-server communication channel.

Distributed data processing system 100 may in one example be the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. The distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

As shown, the various information processing systems, including servers 104, 106, clients 110, 112, 114 and other network resources such as storage 108 or an optional network workload manager (not illustrated), can be networked together using computer network 102. Types of computer network 102 that can be used to interconnect the various information processing systems include Local Area Networks (LANs), Wireless Local Area Networks (WLANs), the Internet, the Public Switched Telephone Network (PSTN), other wireless networks, and any other network topology that can be used to interconnect the information processing systems. Many of the information processing systems include nonvolatile data stores, such as hard drives and/or nonvolatile memory. The nonvolatile data store can be a component that is external to the various information processing systems or can be internal to one of the information processing systems.

Figure 2:
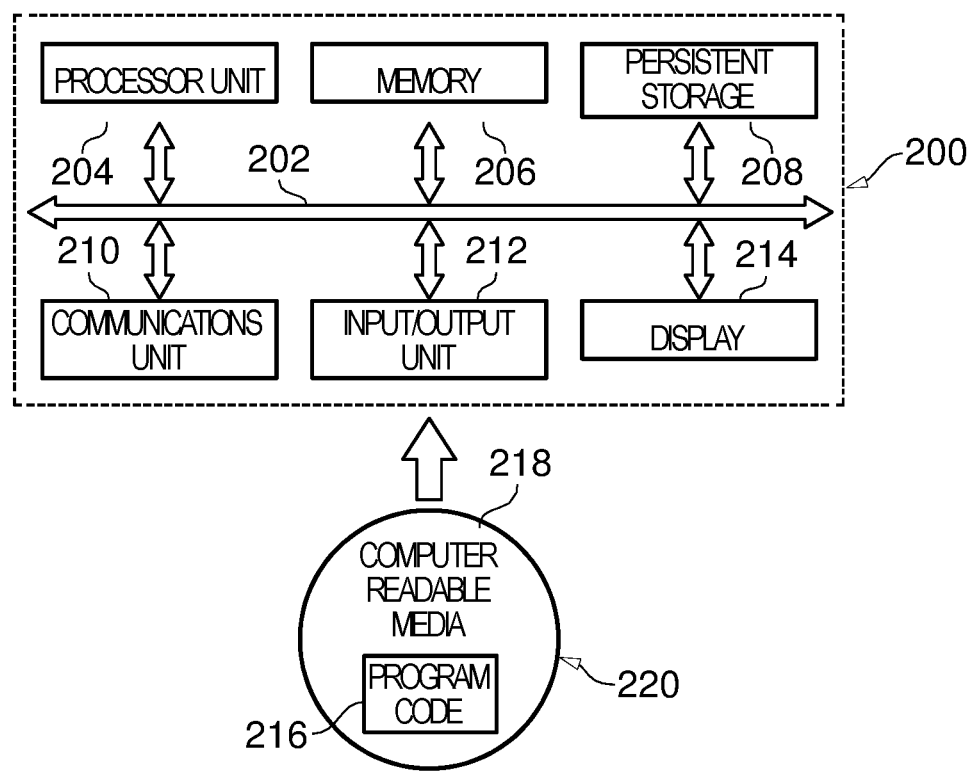
FIG. 2 is an exemplary block diagram of a first embodiment of a data processing system according to the present invention.

FIG. 2 is a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, Bernoulli cartridges, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIG. 1 and FIG. 2 may vary depending on the implementation. Other internal hardware or peripheral devices, such as flash memory, equivalent non-volatile memory, or optical disk drives and the like, may be used in addition to or in place of the hardware depicted in FIG. 1 and FIG. 2. Also, the processes of the illustrative embodiments may be applied to a multiprocessor data processing system, other than the SMP system mentioned previously.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

In various embodiments, the network 102 may be a public network, such as the Internet, a physical private network, a virtual private network (VPN), or any combination thereof. In certain embodiments, the network 102 may be a wireless network, including a personal area network (PAN), based on technologies such as Bluetooth or Ultra Wideband (UWB). (Note: the term(s) "Bluetooth" and/or "Ultra Wideband" may be subject to trademark rights in various jurisdictions throughout the world and are used here only in reference to the products or services properly denominated by the marks to the extent that such trademark rights may exist.) In various embodiments, the wireless network may include a wireless local area network (WLAN), based on variations of the IEEE 802.11 specification, often referred to as WiFi. (Note: the term "WiFi" may be subject to trademark rights in various jurisdictions throughout the world and are used here only in reference to the products or services properly denominated by the marks to the extent that such trademark rights may exist.) In certain embodiments, the wireless network may include a wireless wide area network (WWAN) based on an industry standard including two and a half generation (2.5G) wireless technologies such as global system for mobile communications (GPRS) and enhanced data rates for GSM evolution (EDGE). (Note: the term(s) "GPRS," "EDGE," and/or "GSM" may be subject to trademark rights in various jurisdictions throughout the world and are used here only in reference to the products or services properly denominated by the marks to the extent that such trademark rights may exist.) In various embodiments, the wireless network may include WWANs based on third, fourth or fifth generation (3G, 4G, 5G) wireless technologies including universal mobile telecommunications system (UMTS) and wideband code division multiple access (W-CDMA) and new radio (NR). (Note: the term(s) "universal mobile telecommunications system," "wideband code division multiple access" and/or "new radio" may be subject to trademark rights in various jurisdictions throughout the world and are used here only in reference to the products or services properly denominated by the marks to the extent that such trademark rights may exist.)

Other embodiments may include the implementation of other 3G technologies, including evolution-data optimized (EVDO), IEEE 802.16 (WiMAX), wireless broadband (WiBro), high-speed downlink packet access (HSDPA), high-speed uplink packet access (HSUPA), and 4G or 5G wireless technologies. (Note: the term(s) "evolution-data optimized," "WiMAX," "WiBro," "high-speed downlink packet access," and/or "high-speed uplink packet access" may be subject to trademark rights in various jurisdictions throughout the world and are used here only in reference to the products or services properly denominated by the marks to the extent that such trademark rights may exist.)

A server in the context of embodiments of the disclosure may in some cases also be a 'classic' mainframe, or hosted in a mainframe. Mainframe computer systems are widely used for a variety of data processing functions. For example, many corporate financial and accounting systems were developed for, and operate on, mainframe computing systems. Although the use of personal computers and personal computer networks has proliferated in recent years, mainframe computer systems, referred to as legacy systems, are expected to remain popular for many types of data processing for years to come. A mainframe computer system typically includes multiple user terminals connected to a mainframe host computer. Various software applications may be resident on, or accessible to, the host computer. The user terminals, which are sometimes referred to as client terminals or "clients," communicate with the mainframe host computer via a host communications system. The IBM 3270 terminal system is one of the more widely-used systems for communicating with host computers. Typically, a 3270 terminal does not have its own data processing capability. Instead, a 3270 terminal may display screens generated by applications running on a host, and may communicate information from a user back to a host for processing. A user interface of an IBM 3270 terminal system comprises a plurality of screens that are generated by host applications for display on the 3270 terminal. Over the past few years, many 3270 terminals have been replaced with personal computers (PCs) configured to communicate with the mainframe computer system via 3270 terminal emulation software.

In many applications, 3270 terminals, or other data processing devices (e.g., a PC) emulating a 3270 terminal, now access the host computer via the Internet. For example, in systems operating under the TN3270E protocols, the 3270 terminals may access application software on a host computer via a combination of a TCP/IP connection between the TN3270E client terminal and a TN3270E server, and via a Systems Network Architecture (SNA) session between the TN3270E server and the SNA application software on the host mainframe computer.

It is also known to integrate client-server technologies within mainframe computing environments. A representative multi-component system of this type, wherein components work together cooperatively to form a larger system, is the HyperText Transfer Protocol (HTTP) and Web Services processing environment, which may be implemented using IBM mainframe computers, such as the z196 family of computing machines. This environment typically includes WebSphere Application Server (WAS) middleware platform software product, working in conjunction with one or more transaction processing products, such as Customer Information Control System (CICS) and/or Information Management System (IMS), a message processing product, such as WebSphere MQ, and a relational database, such as the DB2 database. (Note: the term(s) "WebSphere," "Information Management System," and/or "DB2" may be subject to trademark rights in various jurisdictions throughout the world and are used here only in reference to the products or services properly denominated by the marks to the extent that such trademark rights may exist.) An objective of a multi-component environment is to provide a high performance transaction processing computing system or environment accessible to client end-users via Internet browsers using HTTP or other Web Services. In this environment, the client end-user making the HTTP or Web Services request communicates directly with the application server. Typically, to fulfill the transaction request from the distributed client end-user, the application server invokes the services of one or more other components in the environment. One of more of these components typically execute on an operating system, such as IBM z/OS operating system, which is often referred to as a "mainframe" operating system platform.

Figure 3:
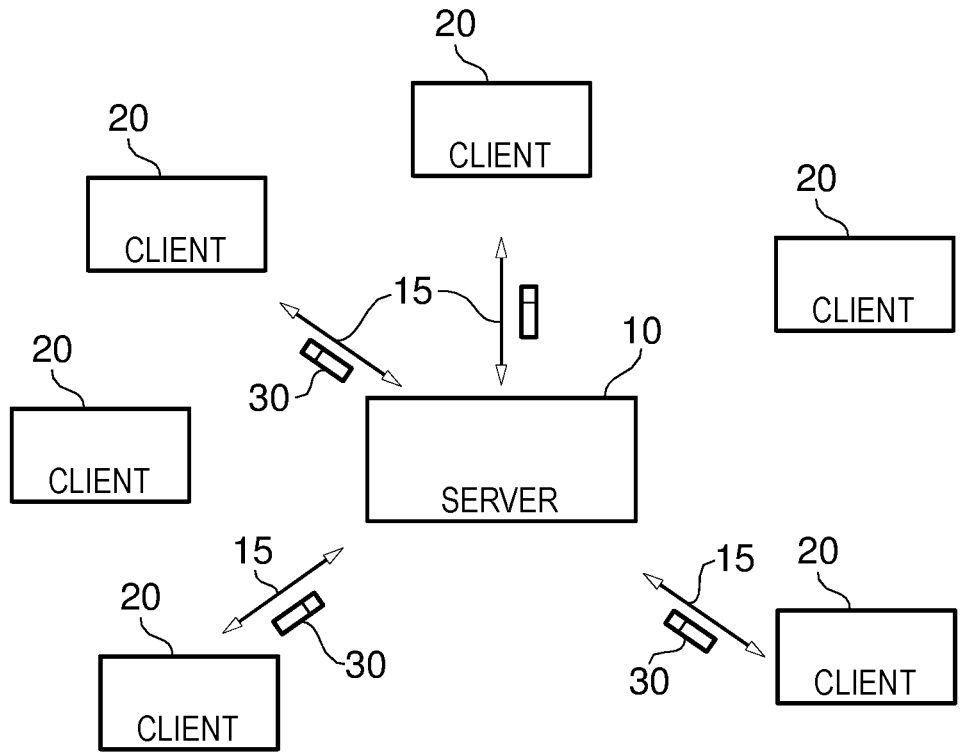
FIG. 3 is a schematic representation of a first embodiment system environment in which a single server and multiple clients are connected via network connections according to the present invention.

FIG. 3 is a schematic representation of a system environment for embodiments of the invention in which a single server and multiple clients are connected via network connections. A server 10, which may for example be a CICS TS and may correspond to either of the servers shown in FIG. 1, is in a system region where a number of clients 20 are also arranged. The system uses a network protocol, such as TCP IP, to allow the different nodes to communicate. Each client 20 is able to establish a network connection 15 using the network protocol to at least the server 10. The network connections persist until terminated, so may be long lived. Selected ones of the clients are shown having current network connections to the server, noting that multiple concurrent network connections are illustrated. Each established network connection is managed by sending and receiving messages 30, typically in packet form, from server to client and client to server respectively. Client-to-server messages may contain tasks or requests for the server, and server-to-client messages may contain responses relating to such tasks or requests.

Figure 4:
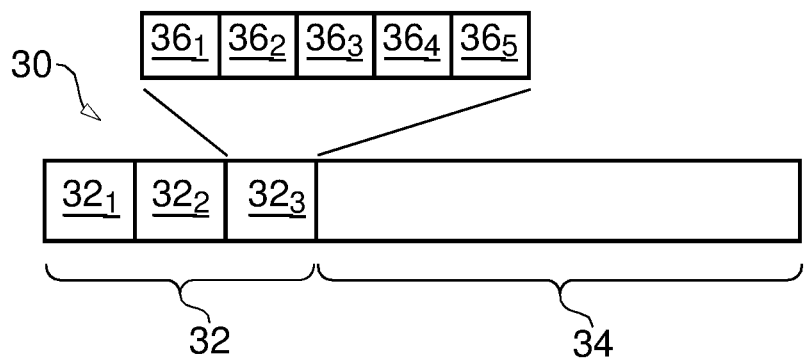
FIG. 4 shows a first embodiment of a message structure for messages being sent via the network connections of FIG. 3 according to the present invention.

FIG. 4 shows a message structure for messages being sent via the network connections of FIG. 3. Each message comprise a header portion 32 and a payload or body portion 34. The header contains control information that is used by the message recipient's connection manager, whereas the body 34 contains details of the service that the client is requesting to run there. The header portion 32 may be split into a set of multiple fields 321, 322 . . . 32n. each conveying different command and control information relating to the message by which its payload portion 34 can be appropriately processed on receipt. It is noted that the header fields may simply be referred to as headers, so that each message can be described as being made up of a set of one or more headers and a body.

Figure 5:
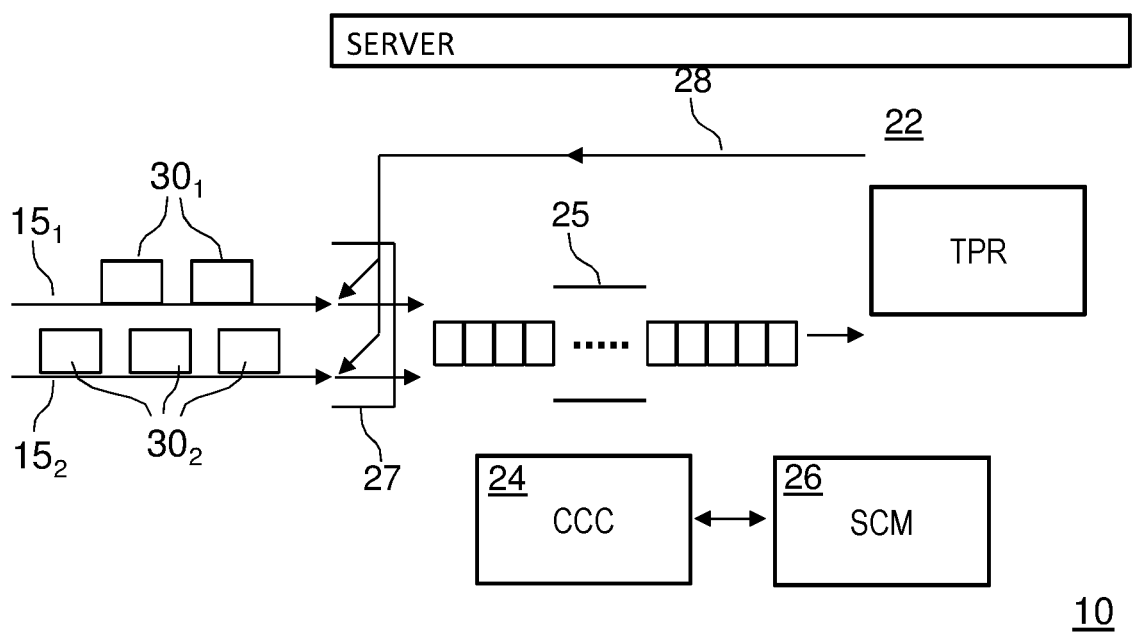
FIG. 5 shows the server of FIG. 3 in more detail.

FIG. 5 shows the server 10 of FIG. 3 in more detail. By way of example to discuss the operating principles, two current client connections are shown 151 and 152, although it will be appreciated there may be any number and in practice the number will usually be more than two. A client-server connector 27 acts as an input/output interface of the server 10 and, in particular, is operable to establish, maintain and terminate individual client-server connections 151 and 152 to the server 10. Packets 301 and 302 are sent from the respective clients on connections 151 and 152 respectively, the packets containing messages for the server 10 including requests or tasks. Each of the connections is specified with a maximum request limit. For example the maximum request limit could be 100 for connection 151 and 50 for connection 152, with the server's maximum request limit being 120. This is a typical configuration in the sense that the combined connection session limit of 150 exceeds the server's limit of 120.

The incoming requests are queued in a queue 25 which feeds in to a transaction processing component (TPC) 22 of the server 10, which processes the requests or tasks. When the TPC 22 is operating at less than full capacity, the requests will be directly input into the TPC 22 with no appreciable waiting time in the queue 25 or may bypass the queue completely. On the other hand, when the TPC 22 is operating at full capacity, the requests will be queued. Processed requests are replied to by the TPC 22 issuing reply information which is assembled into packets and sent back to the client that originated the request on client connection 151, 152 etc. as indicated by the arrowed lines flowing from TPC to client connections 151 and 152.

The server 10 is additionally provided with a connection capacity controller (CCC) 24 and a server capacity monitor (SCM) 26.

CCC 24 monitors the number of requests received from each connection attached to clients and from which client the requests originated. For example, at one time, CCC 24 may know that there are 38 as-yet unreplied requests from a first connection and 17 as-yet unreplied requests from a second connection. CCC 24 monitors connections being established and terminated, and so maintains a record of the connections that are currently active, and for each active connection the maximum number of concurrent requests it is capable of, or permitted to, support. CCC 24 may also keep a record of the maximum number of outstanding requests from each connection during a current session, or in the recent past based on a rolling time window. This maximum number will therefore represent a high water mark of activity for a given connection.

SCM 26 monitors the spare capacity of the server 10 and in particular the TPC 22 to handle client requests. SCM 26 has knowledge of the maximum capacity of the server 10, and monitors how many requests it is currently handling, and thereby monitors the loading level of the server. In particular, SCM 26 detects when the server 10 is approaching, or has reached, full capacity. SCM 26 can directly monitor how many requests the server is handling, or can infer that full capacity has been reached by monitoring the fill state of the queue 25. That is, if the queue 25 is empty or near empty, then it can be inferred the server has spare capacity, whereas if several requests are queued or queue dwell time per request is above a threshold time, then it can be inferred that the server is operating at or near full capacity. SCM 26 also is operable to analyze metadata in each request, either in the incoming packets 30, or in the requests waiting in the queue 25, which serves as an identifier of the originating client 20 or client-server connection 15. When a threshold is reached the SCM 26 applies logic embodied in computer code portions to decide which connections need to be constrained using the task metadata which provides information about the origin of each task related to each connection. SCM 26 then sends a message to CCC 24 to inform CCC 24 that one or more current connections need to be constrained. CCC 24 is then operable by applying logic embodied in computer code portions to determine how much each connection is to be reduced by. The instruction from CCC 24 to a client 20 to reduce connection capacity on that client-server connection, i.e. a connection's maximum request limit, is transmitted to the client by inserting the instruction in message metadata of a packet being sent back to the client. This may conveniently be a packet being assembled for the client containing a response to an earlier request from that client. On receipt of the instruction, the client knows not to exceed the new, reduced maximum request limit. The server may optionally be configured to reject messages from the client arriving over a client-server connection which exceed the maximum request limit for that connection. This may be a general configuration, or a configuration that is only applied if a reduced, maximum request limit is currently being applied, i.e. a maximum request limit lower than a default value set when the connection was established. CCC 24 may be given this role of rejecting messages.

The above-described functionality is also reversible, by which it is meant that the request limit may be raised again by CCC 24 when it is detected that the overload state no longer persists. Detection of an overload state can be the same as described above, e.g. by monitoring the queue 25, or by counting in incoming requests and counting out outgoing responses.

In this way the capacity of each of multiple connections can be controlled by the server individually or as a group, wherein the control is dynamic, so that the client-server connections do not have to be accurately configured in advance.

An example process flow could be as follows:

CCC 24 monitors the amount of work arriving over all connections.

SCM 26 monitors the total amount of work running in the server and where it originated, i.e. from which client or connection.

Work arrival rate increases by an amount sufficient to cause the amount of requests running in the server to exceed the configured system request limit (for example 120 referring back to the specific numbers mentioned further above).

SCM 26 through its monitoring activity becomes aware of this overload condition.

SCM 26 uses task meta-data to analyze the origin of each task in the system, and discovers that 90% of requests are arriving via a first connection and 10% via a second connection.

SCM 26 informs CCC 24 to achieve a target total reduction of 10% of combined incoming workload, where the reduction should be allocated proportionally, i.e. 90% to the first connection and 10% to the second connection.

CCC 24 calculates the reduction in the session limit necessary to reduce the incoming workload by 10%. An example for the first connection, if this has a current high water mark usage of 95 outstanding requests, then a maximum request limit for the first connection would be set which would be 10% less than 95, i.e. 86. A similar calculation is made for the second connection.

CCC 24 sends a capacity change notification to each of the first client and the second client instructing them to operate with the reduced limits.

CCC 24 continues to monitor incoming messages and the queue, and, depending on the fill state of the queue, may reject any requests from the connections which exceed their new limits. That is the rejection may only be activated if there is significant queueing.

Over time, there is a reduction in the server loading which is recognized by the SCM, whereupon the SCM 26 issues an event to the CCC, so that the CCC 24 can decide to increase the session limits as appropriate, either back to their default limits, or to some intermediate value between the current reduce limit and the default limit.

Figure 6:
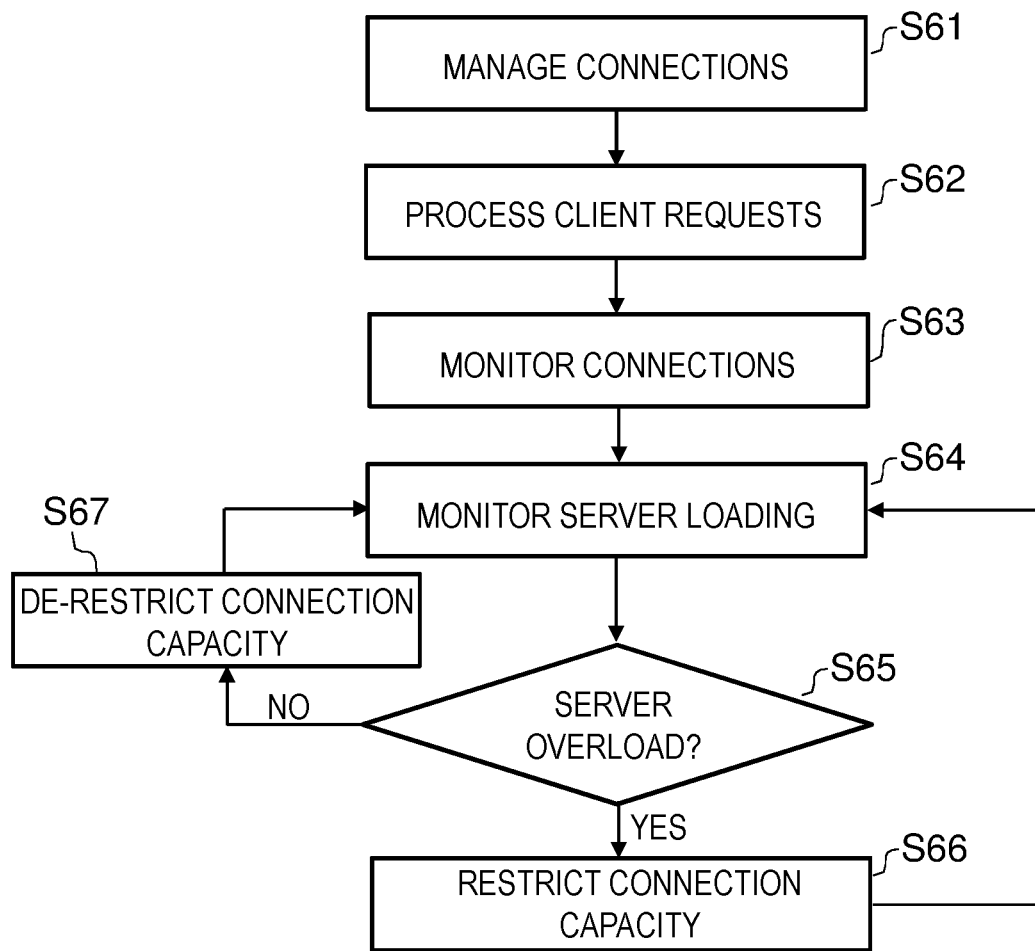
FIG. 6 is a flow chart of a first embodiment connection management method performed, at least in part, by the server of FIG. 5.

FIG. 6 is a flow chart of the connection management performed by the server of FIG. 5. The method shown in the flow chart manages multiple, concurrent client connections to a transaction processing server.

In Step S61, the server through its client-server connector establishes, maintains and terminates individual client-server connections to the server, each connection being capable of transmitting client requests to the server and each connection being configured to support a default, maximum permitted number of concurrent requests.

In Step S62, the client requests are processed in a transaction processing component of the server. Once processed, appropriate responses are sent back to the clients that originated the requests.

In Step S63, a connection capacity controller monitors how many client-server connections are current and, for each current connection, stores the default, maximum numbers of permitted concurrent requests that connection is configured to support. The default will be the value that was defined when the connection was established.

In Step S64, a server capacity monitor monitors the load state of the server, for example having regard to a maximum number of permitted concurrent requests the server is configured to support. Here an overload is defined as a situation in which the server cannot process the amount of requests that are pending, e.g. there are some queued requests, and an underload or spare capacity is defined as a situation in which the server is able to accept new requests as may be inferred for example by the absence of any queued pending requests. If overload state is defined directly by comparing the number of concurrent requests being handled and the maximum permitted number, then an overload state could be defined as the maximum number being reached, being approached (e.g. 90 or 95% full capacity) or being exceeded, if the number of concurrent requests includes those that are queued as well as those that are actually being processed by the TPC.

In Step S65, the server capacity monitor monitors the load state of the server, i.e. whether the server's maximum permitted number of concurrent requests has been exceeded.

If yes (i.e. server overload detected), then in Step S66, the server capacity monitor issues a command to the connection capacity controller, which then acts to restrict the overall connection capacity on the current connections. It does this by reducing the maximum permitted numbers of concurrent requests on one or more of the current client-server connections. The connection capacity controller applies logic based on analysis of the origin of recent and/or pending requests, i.e. which clients they came from, to decide whether to restrict all current connections proportionally or whether to restrict the current connections disproportionately. For example, if there is one extremely active connection and several other connections with much lower levels of activity, the connection capacity controller might decide only to restrict the extremely active connection. Restriction is implemented by the connection capacity controller transmitting to at least one of the clients with a current client-server connection a reduced, maximum permitted number of concurrent requests for that client-server connection.

If no (i.e. server not overloaded), then in Step S67, conditional on at least one of the current connections operating under a restricted capacity, i.e. with a reduced, maximum permitted number of concurrent requests, then the server acts to fully or partially lift the restrictions. This is implemented by the server capacity monitor issues a command to the connection capacity controller to increase the maximum number of concurrent requests on at least one of the current client-server connections that is operating with a reduced, maximum permitted number of concurrent requests. The increase may be back to the default, maximum permitted number for that client-server connection, i.e. a full lifting of the restriction, or an increase to an intermediate value, representing an easing, i.e. partial lifting, of the restriction.

The method thus dynamically controls the capacity of each of multiple connections, so that even if the initial configuration of the client-server connections in relation to their permitted capacities turns out to have been inappropriate, the system recovers to avoid server overload. Moreover, this dynamic management of the server loading takes place solely through the novel design of the server. No modification of the clients is needed. Moreover, no other network resources, such as a workload manager carrying out load balancing, is involved. Nevertheless, it is noted that the proposed method and server can operate in parallel with such load balancing.

It will be understood that embodiments of the present disclosure may be implemented using cloud computing. Specifically one or more of the servers and network resources may be hosted in the cloud.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
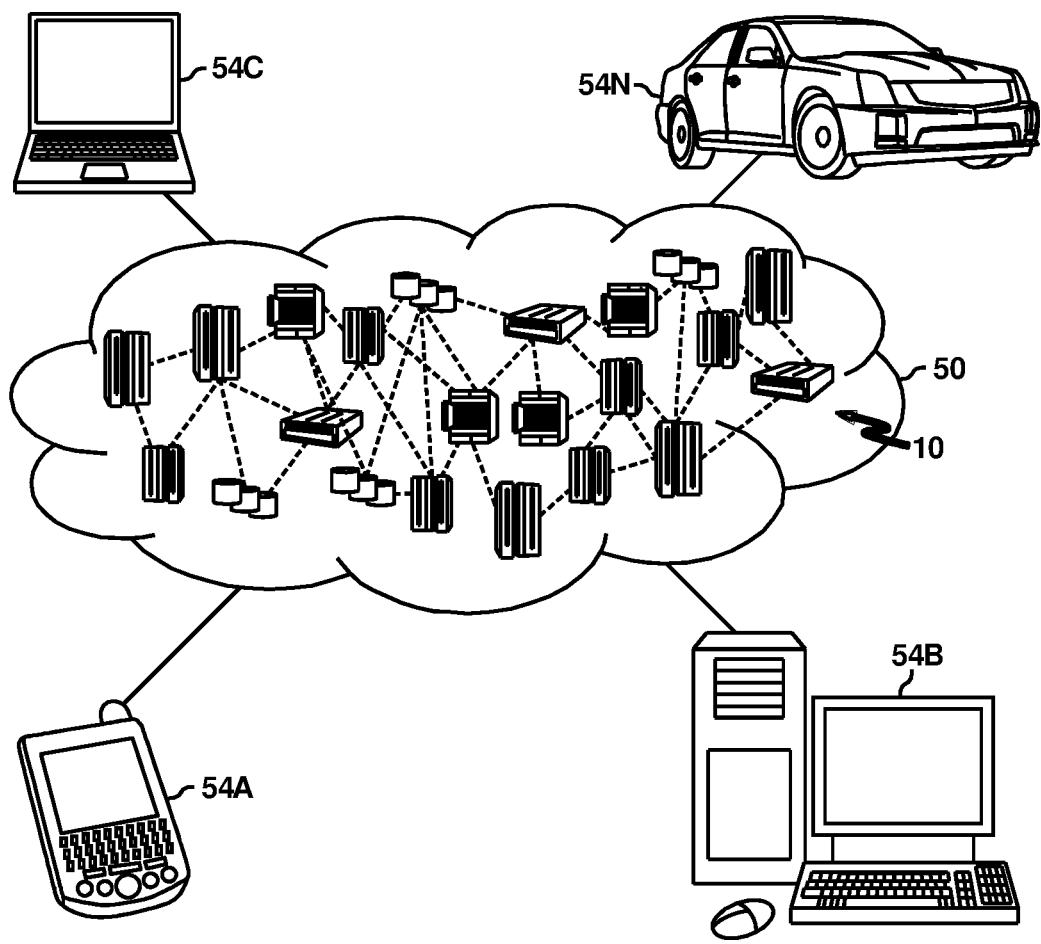
FIG. 7 depicts an illustrative cloud computing environment according to the present invention.

Referring now to FIG. 7, illustrative cloud computing environment 50 is depicted. As shown, cloud computing environment 50 includes one or more cloud computing nodes with which local computing devices used by cloud consumers, such as, for example, personal digital assistant (PDA) or cellular telephone 54A, desktop computer 54B, laptop computer 54C, and/or automobile computer system 54N may communicate. Nodes may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes and cloud computing environment 50 can communicate with any type of computerized device over any type of network and/or network addressable connection (e.g., using a web browser).

Figure 8:
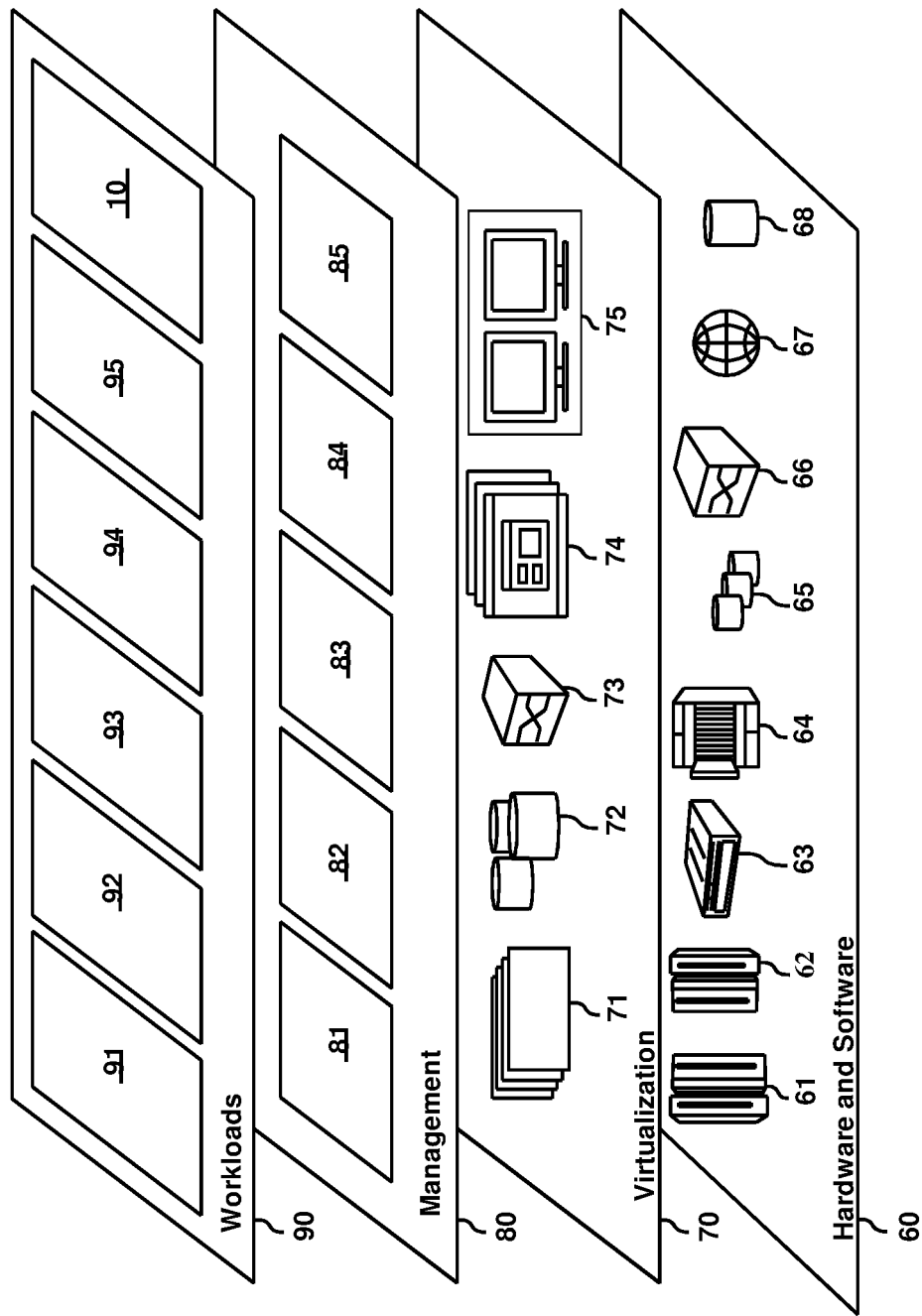
FIG. 8 depicts illustrative abstraction model layers of the cloud computing environment of FIG. 7 according to the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

It will be appreciated that any of the servers or server elements shown in FIG. 1 and FIG. 2, may correspond to physical or virtualized components in layers 60 and 70 respectively.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and server 10.

It will be clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present disclosure may be realized in the form of a computer implemented method of deploying a service comprising steps of deploying computer program operable to, when deployed into a computer infrastructure and executed thereon, cause the computing device to perform all the steps of the method.

It will be appreciated that the method and components of the preferred embodiment may alternatively be embodied fully or partially in a parallel computing system comprising two or more processors for executing parallel software.

A further embodiment of the disclosure is a computer program product defined in terms of a system and method. The computer program product may include a computer-readable storage medium (or media) having computer-readable program instructions thereon for causing a processor to carry out aspects of the present disclosure.

The computer-readable storage medium can be a tangible device that can retain and store instructions for use by an instruction execution device.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention may be a client, a server, a computer system comprising client and server connected over a network, a method, and/or a computer program product. The computer program product may include a computer readable storage medium (or media) having computer readable program instructions thereon for causing a processor to carry out aspects of the present invention.

It will be clear to one skilled in the art that many improvements and modifications can be made to the foregoing exemplary embodiment without departing from the scope of the present disclosure.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method for managing concurrent client connections to a transaction processing server, the method being performed by the server and comprising:
   establishing a set of individual connections to a server, the individual connections being client-server connections;
   maintaining each individual connection to the server wherein each individual connection is capable of transmitting a client request to the server and each connection is configured to support a certain number of concurrent requests, the certain number being a default, maximum permitted number;
   processing a client request in a transaction processing component of the server;
   issuing a response to the client request to an originating client;
   monitoring in a connection capacity controller how many client-server connections are current;
   recording in a log the certain number of concurrent requests permitted by a client-server connection;
   monitoring in a server capacity monitor a loading of the server having regard to the certain number of concurrent requests the server is configured to support;
   detecting in the server capacity monitor that the server is in an overloaded state;
   issuing a command from the server capacity monitor to the connection capacity controller to reduce the certain number concurrent requests to a reduced number of concurrent requests;
   transmitting from the connection capacity controller to at least one of the clients with a current client-server connection the reduced number of concurrent requests; and
   responsive to the client-server connection operating with the reduced number of concurrent requests and the server capacity monitor detecting that the server has recovered from its overloaded state, the server capacity monitor issuing a command to the connection capacity controller to increase the reduced number of concurrent requests to a higher number of concurrent requests for the client-server connection.

2. The method of claim 1, wherein the connection capacity controller rejects a client-server request received on the client-server connection when the client-server connection reaches the certain number of concurrent requests.

3. The method of claim 2, wherein the connection capacity controller rejects a client request on the client-server connection when the client-server connection is operating with a reduced number of concurrent requests.

4. The method of claim 1, wherein:
   client requests for the server are queued in a queue when the server has no capacity to accept them, and
   the server capacity monitor monitors loading of the server by monitoring a fill state of the queue.

5. The method of claim 1, wherein the server capacity monitor monitors loading of the server by monitoring activity within the server.

6. The method of claim 1, wherein the server capacity monitor monitors loading of the server by comparing how many client requests the server is processing with the certain number of concurrent requests.

7. The method of claim 1, further comprising:
   terminating the client-server connection to the server.

* * * * *